United States Patent
Priev et al.

(10) Patent No.: US 9,436,819 B2
(45) Date of Patent: Sep. 6, 2016

(54) SECURELY PAIRING COMPUTING DEVICES

(71) Applicant: Intel Corporation, Santa Clara, CA (US)

(72) Inventors: Avi Priev, Jerusalem (IL); Avishay Sharaga, Bet Nehemya (IL); Hormuzd Khosravi, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 59 days.

(21) Appl. No.: 14/493,621

(22) Filed: Sep. 23, 2014

(65) Prior Publication Data

US 2016/0085960 A1 Mar. 24, 2016

(51) Int. Cl.
*G06F 21/44* (2013.01)
*G06F 21/31* (2013.01)
*H04W 12/06* (2009.01)
*H04L 9/08* (2006.01)

(52) U.S. Cl.
CPC ............. *G06F 21/44* (2013.01); *G06F 21/31* (2013.01); *H04L 9/0861* (2013.01); *H04L 9/0894* (2013.01); *H04W 12/06* (2013.01)

(58) Field of Classification Search
CPC ...... G06F 21/602; G06F 21/00; G06F 21/60; G06F 21/44; G06F 21/31
See application file for complete search history.

(56) References Cited

U.S. PATENT DOCUMENTS

| | | | |
|---|---|---|---|
| 6,754,826 B1 * | 6/2004 | Challener | H04L 63/0823 370/233 |
| 2006/0288204 A1 * | 12/2006 | Sood | H04L 63/123 713/161 |
| 2007/0121947 A1 | 5/2007 | Sood et al. | |
| 2007/0192832 A1 * | 8/2007 | Qi | G06Q 20/3821 726/3 |
| 2007/0280481 A1 * | 12/2007 | Eastlake | H04W 12/04 380/277 |
| 2008/0183305 A1 | 7/2008 | Foster et al. | |
| 2010/0189265 A1 | 7/2010 | Ito et al. | |
| 2011/0167262 A1 * | 7/2011 | Ross | H04W 12/06 713/168 |
| 2011/0305333 A1 | 12/2011 | Jacobson et al. | |
| 2012/0259612 A1 * | 10/2012 | Lyons | G06F 3/162 703/21 |
| 2012/0303476 A1 * | 11/2012 | Krzyzanowski | G06F 8/60 705/26.5 |
| 2013/0079014 A1 * | 3/2013 | Huang | H04W 12/04 455/437 |
| 2013/0080670 A1 * | 3/2013 | Medica | G06F 1/1626 710/110 |
| 2014/0223174 A1 * | 8/2014 | Krishnamurthy | H04L 63/0823 713/158 |
| 2014/0237250 A1 | 8/2014 | Menezes et al. | |
| 2014/0347799 A1 * | 11/2014 | Ono | H02J 7/025 361/679.09 |

OTHER PUBLICATIONS

U.S. Appl. No. 14/472,645, filed Aug. 29, 2014, entitled "Pairing Computing Devices According to a Multi-Level Security Protocol," by Abhilasha Bhargav-Spantzel, et al.

U.S. Appl. No. 14/493,613, filed Sep. 23, 2014, entitled "Performing Pairing and Authentication Using Motion Information," by Ned M. Smith, et al.

(Continued)

*Primary Examiner* — Chau Le
(74) *Attorney, Agent, or Firm* — Trop, Pruner & Hu, P.C.

(57) ABSTRACT

In an embodiment, an apparatus comprises a secure storage to store an entry having an identifier of a device to be paired with the apparatus and a master key shared between the apparatus and the device, and a connection logic to enable the apparatus to be securely connected to the device according to a connection protocol in which the device is authenticated based on the identifier received from the device and the master key. Other embodiments are described and claimed.

23 Claims, 9 Drawing Sheets

(56) References Cited

OTHER PUBLICATIONS wikipedia.org., "IEEE 802.11i-2004," downloaded Aug. 6, 2014, 5 pages.
Frank McKeen, et al., "Innovative Instructions and Software Model for Isolated Execution," 2013, 8 pages.
Matthew Hoekstra, et al., "Using Innovative Instructions to Create Trustworthy Software Solutions," 2013, 8 pages.
Ittai Anati, et al., "Innovative Technology for CPU Based Attestation and Sealing," 2013, 7 pages.
U.S. Appl. No. 14/472,645, filed Aug. 29, 2014, entitled "Pairing Computing Devices According to a Multi-Level Security Protocol," by Abhilasha Bhargav-Spantzel.
wikipedia.org, "IEEE 802.11i-2004," printed Aug. 6, 2014, 5 pages.
Microsoft, "How to Create and Manage Bluetooth Pairing Relationships," Oct. 16, 2008, 14 pages.
International Searching Authority, "Notification of Transmittal of the International Search Report and the Written Opinion of the International Searching Authority," mailed Dec. 17, 2015 in International application No. PCT/US2015/046213.

\* cited by examiner

SECURELY PAIRING COMPUTING DEVICES

TECHNICAL FIELD

Embodiments relate to securely pairing computing devices.

BACKGROUND

With the drive towards ever smaller form factors for a variety of computing devices, one area of development is in the design of platforms made from detachable portions. For example, some manufacturers are beginning to offer mobile platform form factors having a detachable design such as a 2-in-1 system or other systems having two or more detachable parts. While this form factor provides a user with benefits from a usability point of view (in that the user can use the platform as a tablet computer or as a conventional clamshell laptop computer), it also raises new platform vulnerabilities from a security standpoint.

DETAILED DESCRIPTION

Figure 1:
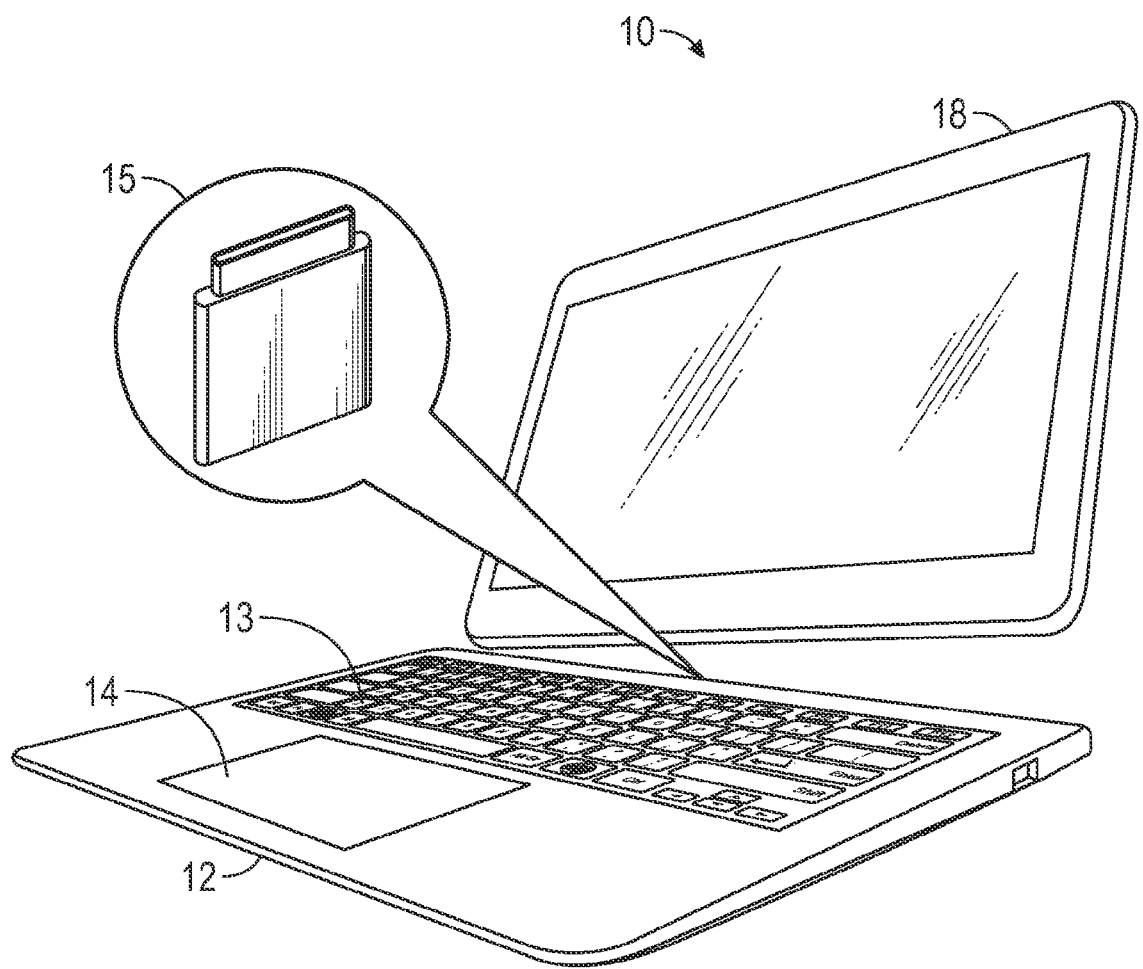
FIG. 1 is an illustration of a portable system in accordance with an embodiment of the present invention.

Embodiments may be used to perform a pairing/binding of different physical parts of one or more platforms. Such operation may especially be performed when the parts are smart (namely including some form of storage to store identifying information, memory and central processing unit (CPU)) to provide control as to what devices are allowed to connect and in what manner (e.g., whether coupling remotely is allowed). Embodiments may further maintain connectivity when parts are detached (e.g., in a point-to-point manner).

In various embodiments, multiple portions of a platform may be securely paired and connected, first via a pairing protocol which in an embodiment may leverage a conventional wireless pairing protocol, and then secure connection via a connection protocol, which may leverage a conventional wireless connection protocol. In various embodiments, at least the pairing protocol between devices may be performed when the devices are directly connected via a physical connection (e.g., a wire or physical connector), according to a given policy. In addition, note that in some embodiments the pairing protocol may be avoided for portions of a detachable platform that were pre-paired during manufacture. In cases where such pre-pairing has not been performed, by performing a direct connection pairing, security can be heightened, particularly where a user initiates a pairing protocol, e.g., according to a pairing request made by user actuation of an input device on one or more of the portions, after user authentication on the different portions (which may be a multi-factor authentication in some embodiments).

In various embodiments, both during a pairing protocol and a connection protocol, the devices may be executing in a trusted execution environment (TEE), which may take the form of combinations of hardware, firmware and software executing on the different portions such that the devices can attest to a trusted or secure environment, in which secrets are validly protected, and communication of stored secrets in a secure storage to a secure processor are sent via a trusted channel that cannot be snooped or attacked by untrusted entities, including an untrusted operating system (OS) or malware executing on the platform. Although embodiments are not limited in this regard, in some cases the TEE may take the form of an Intel® Software Guard Extensions (SGX) enclave in which a processor is provided with hardware support for handling advanced security instructions of an instruction set (or extension there) or an Intel® Converged Security Manageability Engine which provides hardware support for a variety of secure operations. Of course, in other cases, processors of other manufacturers such as processors based on an ARM architecture such as a Coretex core design may be used to perform the secure operations described herein.

As such, embodiments provide techniques to securely pair and connect multiple devices each executing within a trusted execution environment such that platform-level shared secrets may be securely stored and used for purposes of creating pairing and connections such that further communications between the connected devices may be secured by encryption.

With a detachable system and without protection as described herein, physical connection to internal vital interfaces provides an easy way for an intruder or other unauthorized agent to connect to an interface between the different portions for monitoring and hardware-based attacks. In contrast, such interface in a unitary system is internal to the platform and not exposed. In addition, without the protection described herein, non-paired portions could be connected such that unauthorized access to resources in the other portion could occur. Still further, without the protection mechanisms described herein, there is an ability for unauthorized agents to eavesdrop on communications between the separate parts of the platform when remotely connected (or even when physically connected such as when using a National Security Agency (NSA) or other physical adaptor to monitor/sniff information communicated via an internal interface in the connector). Embodiments may be used to protect against these and other potential security vulnerabilities of a system having the capability to provide detachable computing. Still further, understand the scope of the present invention is not limited to such systems and the techniques and mechanisms described herein may equally be applied to other computing systems, particularly in a portable device context.

The pairing and security techniques described herein address the above vulnerabilities and add new functionality in a secure way while maintaining usability of a detachable platform or other system implementing embodiments. Embodiments provide a technique to create a reliable pairing mechanism between 2 (or more) detachable parts of a platform, where the parts are independently controlled by an authorized user (also referred to herein as an "owner"). Understand that while embodiments described herein for ease of illustration are in the context of a detachable platform including two partitions, the techniques can be used in other cases where a detachable platform includes more than 2 detachable portions, and/or where a platform is not a detachable platform. In this way, someone who is not an owner but has physical access to one of the parts will not be able to trigger the pairing process.

The pairing process creates a master key (MK) in both portions. In an embodiment, the generated master key is stored securely in a secure storage of the portions. In this way, the master key is not accessible by untrusted software (including an untrusted operating system (OS) or basic input output system (BIOS)). Next a key derivation process is performed between the two portions to share session/transport keys. In an embodiment, these keys may be updated in a timely manner (e.g., according to a predetermined interval). After derivation of these keys as part of the pairing process, the shared session keys are used for authentication and communication protection when the parts are physically/remotely connected (e.g., depending on a given security policy). Note that this derived MK from the pairing process is used as the MK between the 2 portions of the platform and not specifically for wireless communication, in an embodiment. That is, the MK may be used for authentication and transport key derivation between the 2 parts, depending at least in part on the different way the devices may be connected.

Using an embodiment of the present invention, a level of security may be achieved that is equivalent to the level of legacy platforms that are connected with wires and not accessible unless the platform is tampered with such as by opening the platform. As one example, embodiments provide a wire equivalent protection as implemented by a given wireless protocol. As examples, wireless protocols may include ZigBee™, Bluetooth™, or WiFi™ in accordance with a given Institute of Electrical and Electronics Engineers (IEEE) 802.11 protocol such as according to the IEEE 802.11n specification (published October 2009 as IEEE Std. 2009.5307322), etc. And the wire equivalent protection may be as compared to an Ethernet protocol (e.g., IEEE 802.3).

In an embodiment, the separate portions of the platform each include a secure storage to store a table including entries each to identity permitted pairing devices by way of an identifier for the peer device and a corresponding MK shared between the devices. Note of course that each device may also store its own device ID, which may be stored or hard coded in hardware/firmware. This device ID is stored in a non-volatile, and is the same ID used for all paired devices such that may exist, and is once per platform. In various embodiments, entries may include additional information. As one example, each entry may include a lifetime of the MK (in embodiments in which the MK is valid only for a given duration). In addition, other information may be stored such as transport key lifetime, nonce used for last derivation of transport keys. For a manufactured detachable platform, at manufacture each device is configured with a table in non-volatile storage to store a default entry having the identity of the default other part (namely the other part of the platform as manufactured) and the default MK. Thus in an embodiment, this default entry can be provisioned during manufacturing and is valid forever. Note that in normal use, a given table may store other entries associated with other paired part identities, corresponding MK, and lifetime. When a lifetime expires, a new pairing may be automatically initiated, in some embodiments. Still further, such re-pairing can be done even when the devices are connected remotely (e.g., based on policy). When a part is restored to factory defaults, the only entry that remains is the default entry, in an embodiment.

In one embodiment, a pairing process between two parts uses a wireless-defined pairing protocol (such as a Bluetooth™ pairing protocol) over a physical connection (e.g., a wired connection when the parts are connected) to create corresponding entries in both sides' tables. The identity to be used in pairing is a pairing ID for the device (and not, for example, a Bluetooth™ media access control (MAC) address) for the device.

Based on given policy, an embodiment may first authenticate a user of both devices (e.g., according to a multi-factor authentication) and confirm identity of the user (at least to a given threshold) before the pairing process is enabled. In some cases it may be sufficient from a policy standpoint for a user to be logged in to each device of the to-be-paired devices to confirm that the pairing is not initiated by other than the owner. In other cases, to enhance security, the pairing process may start with the two default parts physically connected and then a new to-be-paired part replaces one of the default devices as part of the process. In other embodiments a stronger pairing protocol may be used instead of a wireless-adapted protocol, in cases where a greater than wire equivalent security is desired.

Thus in one embodiment, in the situation where the portions are provided with a physical connector mechanism, a given connection protocol, e.g., a wireless connection protocol, is initiated when the devices are physically connected. In different embodiments, the portions may perform a Bluetooth™ connection protocol (for paired entities), a Wi-Fi™ 4-way handshake protocol, or some other wireless connection protocol. In both cases, the MK is used as a pre-shared key (PSK), where all communication of the protocol occurs over a physical wire/connector. Using a given one of these protocols proves the identity of each part (authentication) and can further be used to create transport keys that can then be used during operation of the paired and connected devices to encrypt communication over the connector. Note that this encryption may be performed according to any given communication protocol with which the devices communicate (e.g., a USB protocol, a PS2 protocol, a graphics protocol, among others).

In another situation, the portions can be connected device-to-device (D2D) using a given wireless protocol (e.g., WiFi Direct or Bluetooth™) without physical connection. If the connection is trusted, the MK of each part can be used directly as the pairing key/PSK for the wireless communication. In an embodiment, a trusted connection means that the device is directly connected to a trusted entity on the platform (like a trusted execution environment such as Intel® SGX or ARM TrustZone) without OS involvement, as the OS may include a malware to spoof the keys. If instead the keys are provisioned by an OS, a policy may be to not trust the keys and allow connection. Thus in an embodiment, the keys are configured within a TEE and maintained in a secure storage. For stronger security, the devices can be wirelessly connected with the conventional wireless protocol mechanism, and in order to access each other's resources as if connected by wire, the devices perform the wireless connection/4-way handshake over a wireless channel (e.g., using an Internet protocol (IP) connection) as described above as when the devices are physically connected by connector. As such, the same message flow is performed twice, but with different keys and between different entities. The first is with WiFi™ keys between WiFi™ modems and the second using the platform MKs between the two platform parts, where the WiFi™ connectivity is just a transport on part of the communication path.

In yet another situation, the portions can be connected over an IP connection (e.g., remotely over LAN or Internet) and connection occurs the same as the above situation when the devices are connected D2D. That is, here the MK is used for authentication over an IP connection, and the derived transport keys can be used for end-to-end (E2E) encryption of the communication. In this scenario, the two portions may perform a discovery or detection process to identify the presence of each other. To perform the discovery process, a given conventional detection protocol can be used (like domain name service (DNS) using dynamic DNS (DDNS) services).

Embodiments thus use mechanisms that are resident in the separate portions as configured to perform wireless communication in order to create pairing and shared secrets on both sides. In addition to wireless hardware, the portions include a secure storage (which may be a non-volatile memory) to securely store that shared secret. The wireless protocols used to perform authentication and pairing between the devices are thus re-used for communication over a connector/IP and an upper layer of authentication tunneling. In this way, the authentication technique (e.g., the secrets created) is not visible to untrusted hardware or software of the host on both devices. In some embodiments, an internal hardware or firmware trusted platform module (TPM) within the separate devices may be used to perform the dynamic secure pairing between the detachable parts of the system.

Referring to FIG. 1, shown is an illustration of a portable system in accordance with an embodiment of the present invention. As shown in FIG. 1, system 10 is a detachable portable computing device having a base portion 12 and a detachable portion 18. While the term "detachable portion" is used herein, understand that in some embodiments a computing device may have separate compute-capable or smart portions that do not necessarily detach from each other, such as a convertible system in which at least base and display portions are present. However, as used herein understand that the term "detachable portion" is used to generically refer to a separate portion of a system, and in a given context may encompass a separate portion of a system that does not detach, such as in the context of a convertible system.

In one example, system 10 may be a 2-in-1 Ultrabook® computer. Of course in other embodiments, detachable system 10 may take other forms including other small form factor devices that have detachable portions, each of which includes computing capabilities and storage such that each individual portion of the detachable portable device is a compute-capable device, and including at least including some type of processor and some type of storage.

As other examples, system 10 may be an Apple® MacBook Air or another ultralight and thin computing device, and/or ultraportable computing platform. As an example, an ultraportable computing device includes any thin and/or light device capable of performing computing tasks (e.g. user input/output, execution of instruction/code, or network connection, etc.), such as a thin and/or light notebook, laptop, e-reader, tablet, smartphone, phablet and hybrid thereof (e.g. a notebook that is convertible into a tablet, e-reader, etc.). However, an ultraportable computing device or system is not limited to the examples provided above. In fact, as the world of computing becomes more compact and efficient, what is currently considered thin, light, and portable may later be interpreted as large or heavy. Therefore, in one embodiment, thin and light is viewed from the perspective of the current market or known future market for small computing devices. Alternatively, thin and light may be viewed at the time any interpretation of this disclosure is being made.

Still further, embodiments may be implemented within even smaller devices such as wearable devices, e.g., smartwatches, body sensors or monitors and so forth. And embodiments may be used in Internet of Things (IoT) applications in which multiple devices may dynamically and flexibly be in communication with each other. For purposes of example and not limitation, additional examples may include sensor networks (such as a body area network), peer-to-peer wireless networks and pervasive computing networks, among others.

In general, the different portions of system 10 each may include combinations of hardware, firmware and/or software to create a trusted execution environment and to perform secure operations, including secure storage of secrets such as shared secrets as described herein. Note that the different portions may have asymmetric compute capabilities, and that different hardware can be used by each device to create a TEE and perform the security operations described herein. With reference still to FIG. 1, system 10 may include certain of its electronic components within base portion 12, which as seen further includes multiple user interfaces, including a keyboard 13 and a touch pad 14. As an example, base portion 12 may include a mass storage for the system such as a disk drive and/or solid state drive, at least one processor, and a secure storage as described herein (which may be stored in a hidden or isolated portion of the drive). Note that the at least one processor present in base portion 12 may be a low power processor and having limited functionality. Understand that such processor is capable of executing in a TEE to perform the security operations described herein. As one such example, the processor present in base portion 12 may be of an Intel® Atom™-based instruction architecture (IA). Base portion 12 may also include storage extensions, sensor extensions or even more ingredients like another communication core (e.g., WiGig or WWAN) while detachable portion 10 uses WiFi, for example.

To provide interconnection in a physically connected state, a physical connector 15 is provided, at least partially within base portion 12 to enable interconnection of detachable portion 18 thereto. As further illustrated in FIG. 1, detachable portion 18 may include a display of the system, which may be a touch screen display such as a liquid crystal display or a light emitting diode display. Furthermore, detachable portion 18 may include capacitive touch sensitive circuitry to enable user input by way of touch. In an embodiment, detachable portion 18 may include a main processor of the system such as a CPU and a storage such as a system memory (e.g., formed of dynamic random access memory) and at least a portion of a mass storage, e.g., in the form of a solid state drive. Detachable portion 18 may further include a secure storage as described herein, e.g., implemented in a hidden and isolated portion of the solid state drive. In an embodiment, the main processor present in detachable portion 18 may be a multicore processor such as a given Intel® Core™ processor or other such processor that implements an IA-32 or 64 instruction set architecture (ISA). In another embodiment, which is not illustrated, multiple displays may be provided in detachable portion 18 (e.g., a traditional display and an e-ink screen, different display types, or multiple displays of the same type). Detachable portion 18 may further include various capture devices, including a camera device configured to capture video and/or still information, and one or more microphones to receive user voice input. When used in a detachable manner, detachable portion 18 may act as a tablet computer that receives user input, e.g., via a virtual keyboard displayed on the display to enable user actuations via this touch sensing mechanism.

Of course many variations are possible and are contemplated by the various embodiments described herein. For example, the different portions may both include displays such as touchscreens, and after pairing, the display of one device is configured to be a touch keyboard while the display of the other device is configured to be a primary display (and which may also be configured to receive user touch or gesture input).

In addition, one or both devices may further include hardware configured for perceptual computing and/or user authentication to enable user interaction with the system via voice, gesture, touch and in other ways. Here, different sensors are potentially included to detect, utilize, or provide sense information (e.g., visual, auditory, olfactory, kinesthetic, gustatory, 3D perception, temperature, pressure, gas/liquid/solid chemical/molecular makeup sensor, humidity, or any other known sense).

Understand that in other embodiments the system can be configured as a convertible tablet system that can be used in at least two different modes, a tablet mode and a notebook mode. Such convertible system may have two panels, namely a display panel and a base panel such that in the tablet mode the two panels are disposed in a stack on top of one another. In the tablet mode, the display panel faces outwardly and may provide touch screen functionality as found in conventional tablets. In the notebook mode, the two panels may be arranged in an open clamshell configuration. In different implementations, a convertible form factor may include foldable designs, while others include flip, fold, slide, or detach designs to accomplish the conversion between ultrathin notebook and tablet. Note also that given the form factor mode of connection, the secure pairing and connection protocols may be controllably enforced (or not). That is, in an embodiment according to a given policy, the devices may be physically connected and can communicate without encryption, while when not physically connected (and/or according to another policy), the devices may be securely paired and connected such that communication between the devices is unencrypted.

Because system 10 is configurable to operate in either of a connected or detachable manner, potential security issues arise. For example, security vulnerabilities include issues when the devices are physically connected and, more especially, when the portions of the system are detached and either in communication with each other or are being used independently, as described above. Another vulnerability exists in that when the portions are separated, a unauthorized corresponding device may be connected to either of the unconnected portions and may enable an unauthorized user to access information within either of the portions.

Figure 2:
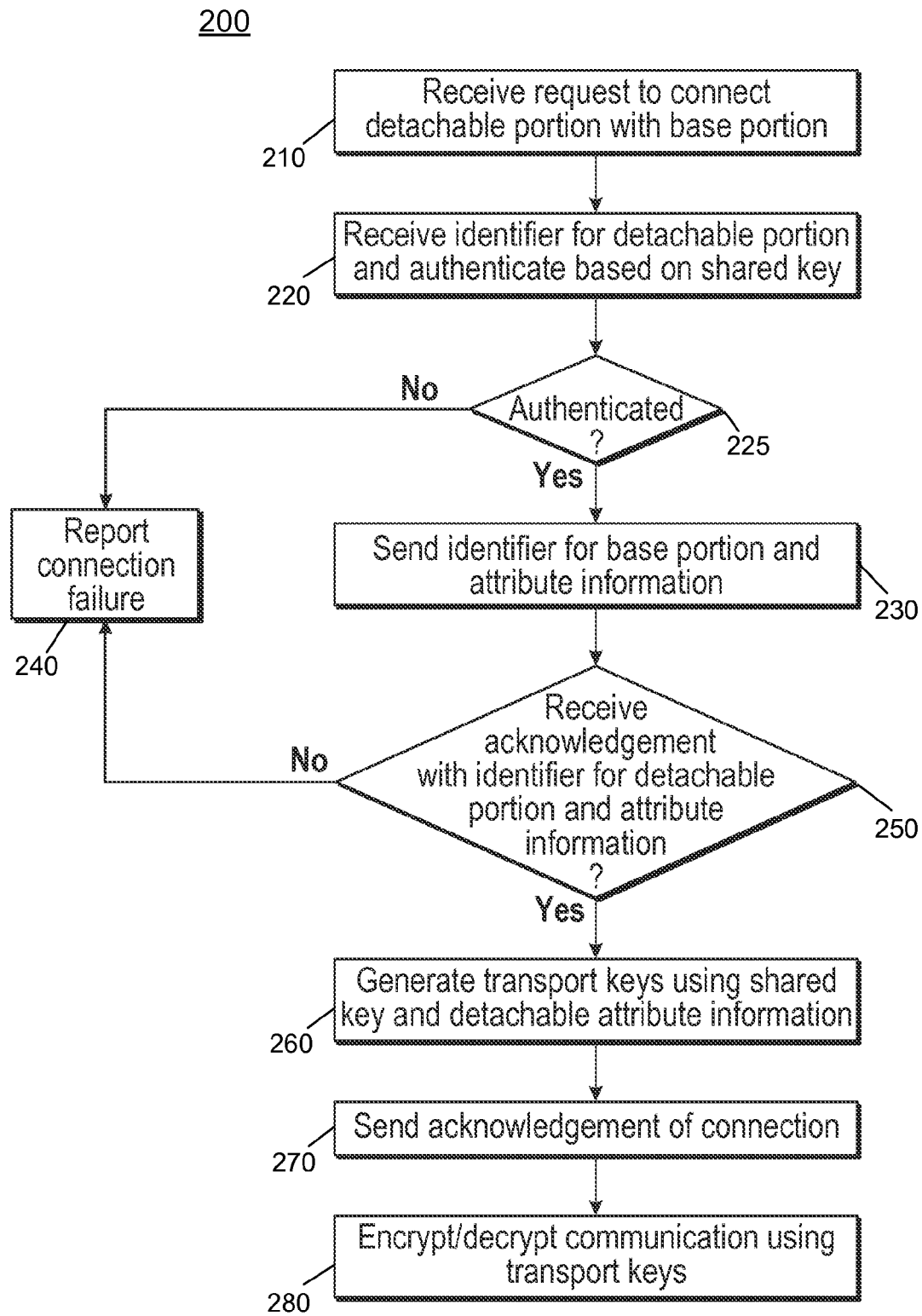
FIG. 2 is a first flow diagram of a secure connection protocol in accordance with an embodiment of the present invention.

Referring now to FIG. 2, shown is a first flow diagram of a secure connection protocol in accordance with an embodiment of the present invention. In the FIG. 2 embodiment, it is assumed that the devices have been previously paired according to a pairing protocol (as described herein). Also in the embodiment of FIG. 2, the protocol is described from the view of a base portion of a detachable portable system having separate base and detachable portions. As seen, method 200 begins by receiving a request to connect (block 210). This request is received in the base portion from the detachable portion.

With this request, an identifier for the detachable portion is received (which may be different than a MAC identifier of the detachable portion), and an authentication may be performed based on a shared key, which may be a MK (block 220). More specifically, based on the received detachable portion ID, a base portion may access an entry in its secure storage (using the detachable portion ID) and determine whether the detachable portion is authenticated (e.g., using the stored shared key). If the authentication is determined (at diamond 225), control passes to block 230 where an identifier for the base portion is sent, with attribute information. Note that if the detachable portion is not authenticated at diamond 225, control passes to block 240 where a connection failure may be reported. For example, a user may be notified of the connection failure via a message on a display of one of the base portion and the detachable portion.

Still referring to FIG. 2, next it is determined at diamond 250 whether an acknowledgment is received from the detachable portion. More specifically, this acknowledgment indicates that the detachable portion successfully authenticated the base portion and has sent, along with the detachable portion identifier, attribute information of the detachable portion. In an embodiment, this attribute information may be similar to that described above. If this acknowledgment and the corresponding identification and attribute information are received, control passes to block 260 where transport keys may be generated. More specifically, the transport keys may be generated using the shared key (e.g., the MK) and the attribute information from the detachable portion.

Control next passes to block 270 where an acknowledgment of connection is sent to the detachable portion. Thus at this point the devices have been successfully securely connected via this connection protocol. Accordingly, communications between devices may be performed in a secure manner at block 280, where the communications are encrypted/decrypted using the transport keys. As such, the data flow between the devices is protected and various attack mechanisms are thus thwarted. Although shown at this high level in the embodiment of FIG. 2, many variations and alternatives are possible.

Figure 3:
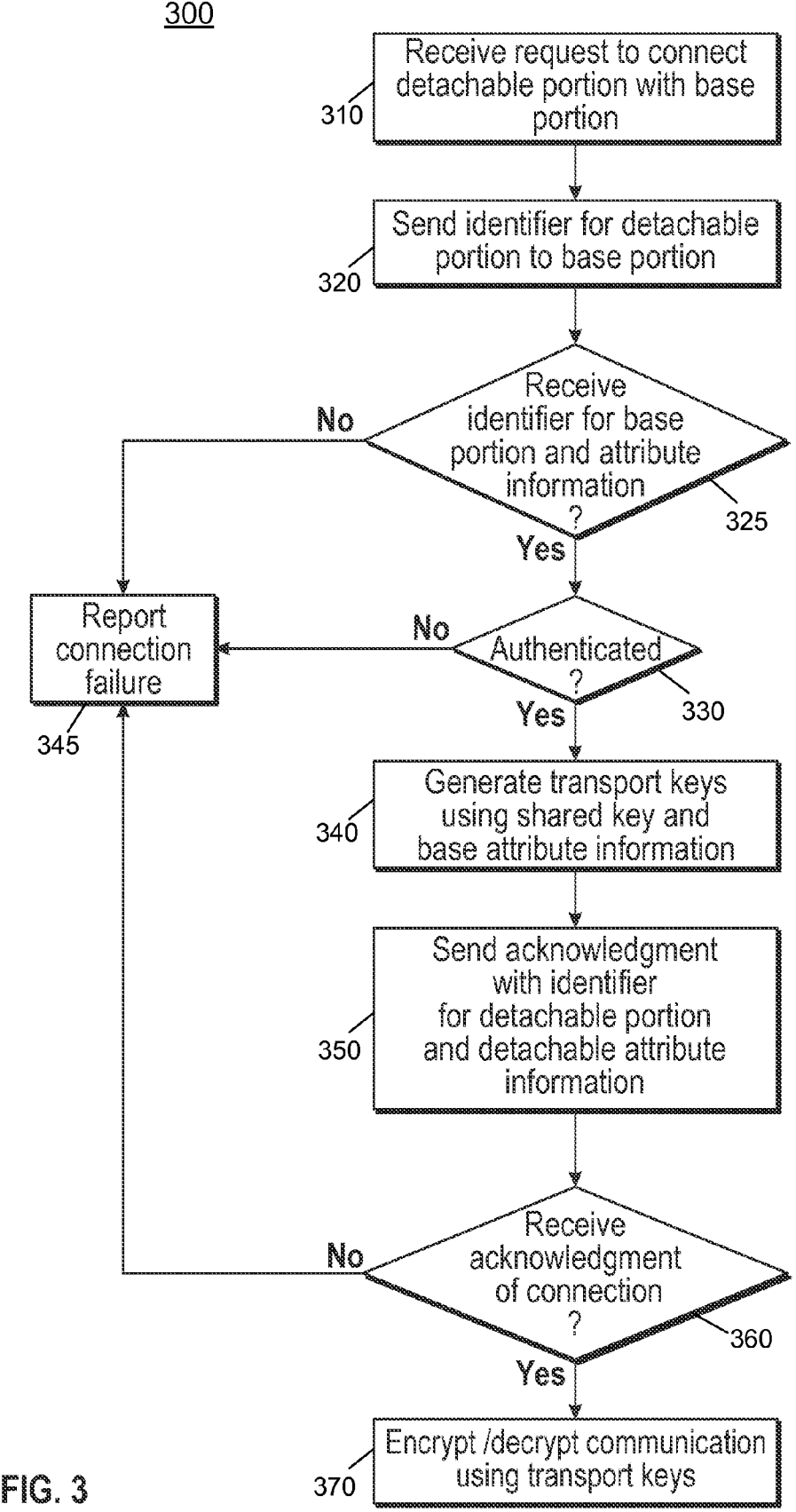
FIG. 3 is a second flow diagram of a secure connection protocol in accordance with an embodiment of the present invention.

Referring now to FIG. 3, shown is a second flow diagram of a secure connection protocol in accordance with another embodiment of the present invention. In the FIG. 3 embodiment, it is assumed that the devices have been previously paired according to a pairing protocol (as described herein). Also, in the embodiment of FIG. 3, the protocol is described from the view of a detachable portion of a detachable portable system having separate base and detachable portions. As seen, method 300 begins by receiving a request to connect (block 310), e.g., from a user of the detachable portion to begin the process.

Responsive to this request, the detachable portion sends a request to the base portion with an identifier for the detachable portion (block 320). Next, it is determined (at diamond 325) whether a response is received from the base portion including an identifier for the base portion and attribute information of the base portion. Note that this response may be sent responsive to authentication of the detachable portion in the base portion, e.g., as performed using a shared key, e.g., a MK as discussed above. Note that if this information is not received (e.g., within a given timeout period), control passes to block 345 where a connection failure may be reported, such as by display of a message on a display of one of the base portion and the detachable portion.

Still referring to FIG. 3, if the expected response is received, next it is determined at diamond 330 whether the base portion is authenticated (diamond 330). In an embodiment, the authentication may be performed using the base portion ID and the shared key. If so, control passes to block 340 where transport keys may be generated. More specifically, the transport keys may be generated using a shared key (e.g., the MK) and the attribute information from the base portion.

Control next passes to block 350, where an acknowledgment of this authentication may be sent to the base portion, along with the detachable portion ID and corresponding attribute information for the detachable portion. Then at diamond 360 it is determined whether an acknowledgment of connection is received. If so, the devices have been successfully connected securely via this connection protocol. Accordingly, communications between devices may be performed in a secure manner at block 370 where the communications are encrypted/decrypted using the transport keys. Although shown at this high level in the embodiment of FIG. 3, many variations and alternatives are possible.

Figure 4:
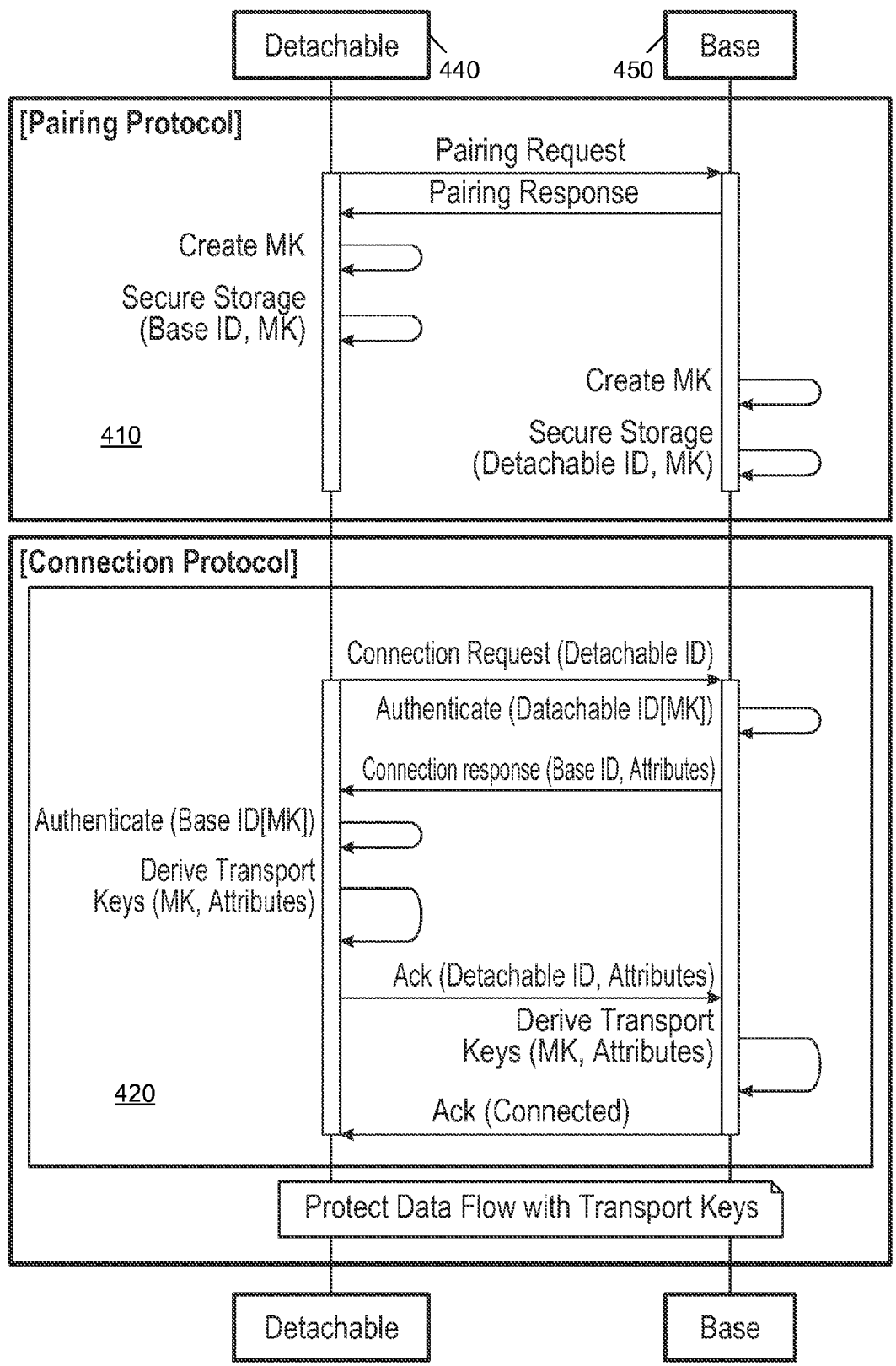
FIG. 4 shows timing illustrations of a pairing protocol and a connection protocol in an embodiment of the present invention.

Referring now to FIG. 4, shown are timing illustrations of a pairing protocol and a connection protocol in an embodiment. As first illustrated in FIG. 4, a pairing protocol 410 is initially used to securely pair the devices. In the embodiment shown in FIG. 4, a detachable portion 440 issues a pairing request to a base portion 450. Note that this request may be sent when the devices are physically connected (which may be a condition required by a given pairing policy). Responsive to this pairing request, a pairing response is issued from base portion 450 to detachable portion 440. In an embodiment, a given wireless pairing protocol such as a Wi-Fi™ or Bluetooth™ pairing protocol may be followed. In response to receipt of this pairing response, detachable portion 440 may create a shared key, namely a MK and store this MK in an entry of a secure storage along with an identifier of the base portion. Similar operations to create and store the shared key in a secure storage of base portion 450 also may be performed such that both devices include corresponding entries in their secure storage that associate the shared key with the device identifier for the other device.

Note that in a given implementation, instead of performing pairing protocol 410 to pair devices during manufacture of a detachable platform including these to-be-paired devices, another process may be performed. Specifically, instead of the pairing protocol, corresponding device identifiers (which may be a given vendor specific identifier) and a shared master key may be fused or burned into a non-volatile storage of the device. As will be described further herein, the location of such secure storage may vary and may take the form of a non-volatile storage present in a security processor or co-processor, a dedicated or shared non-volatile storage (that has a hidden and protected portion) or a mass storage device such as a hard disk drive that includes a segregated portion that is encrypted. In this context, the entries generated and stored in the corresponding storages may be default entries stored during manufacture and fixed or fused into the devices such that these default entries remain after a field reset of the devices to a factory default condition. In other situations of course, this pairing protocol may be performed after manufacture, e.g., where a user seeks to pair a new detachable portion with a given base portion.

Referring still to FIG. 4, a connection protocol 420 occurs between the devices when it is desired to connect the devices for purposes of hardening or securing communications between these devices. In the example shown, assume that the connection is again by way of physical connection of these separate portions of a detachable system. Detachable portion 440 may issue a connection request, which triggers the connection protocol. As seen, various handshake communications are sent between the devices to authenticate the devices and generate transport keys that, upon secure connection, enable a protected data flow. In an embodiment, these operations to connect the devices according to the connection protocol shown may proceed as discussed above with regard to FIGS. 2 and 3.

Figure 5:
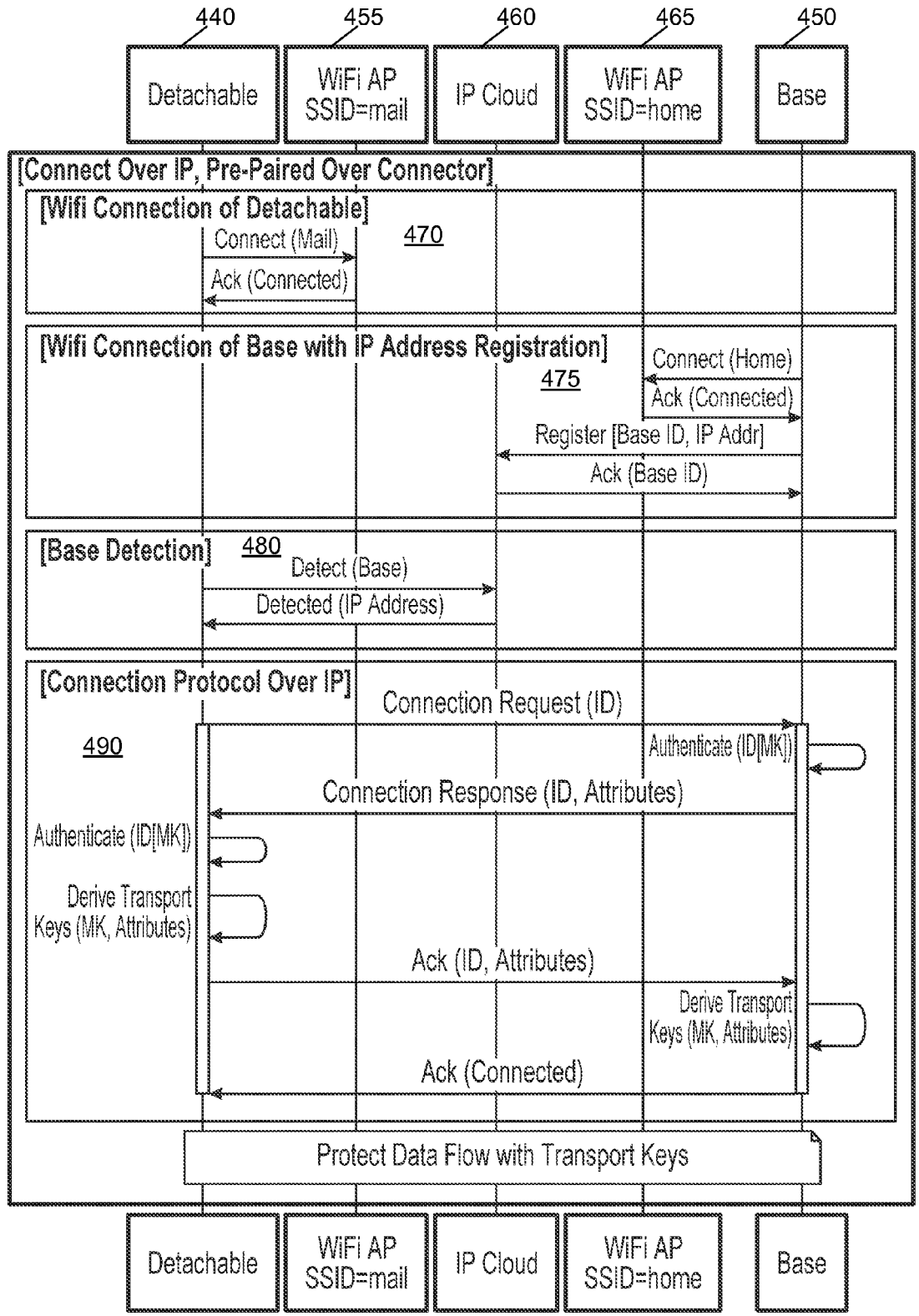
FIG. 5 is another timing illustration of connection of a detachable portion and a base portion of a system in accordance with an embodiment of the present invention.

Referring now to FIG. 5, shown is a timing illustration of connection of detachable portion 440 and base portion 450 via an IP connection, e.g., where the devices are remotely located with respect to each other. As seen, detachable portion 440 is in wireless communication with a wireless access point 455. For example, assume that access point 455 is a hotspot, e.g., in a mall environment. In turn, access point 455 couples to an IP cloud network 460 that in turn is coupled to another access point 465, namely an access point, e.g., within a user's home to which base portion 450 wirelessly communicates.

As seen, initially both devices make connection with their corresponding access points, e.g., according to the given wireless protocol, such as a Wi-Fi™ protocol (at points 470 and 475). Note further at point 475 base portion 450 registers with IP cloud network 460. Next at point 480 a base detection occurs such that detachable portion 440 connects with IP cloud network 460 as well. Thereafter a connection protocol over IP occurs at point 490. Note that this connection protocol may be the same as performed at point 420 in FIG. 4, and may correspond to the operations performed by detachable and base portions described above in FIGS. 2 and 3. However, while shown with this particular illustration in FIG. 5, understand that many variations and alternatives are possible.

Figure 6:
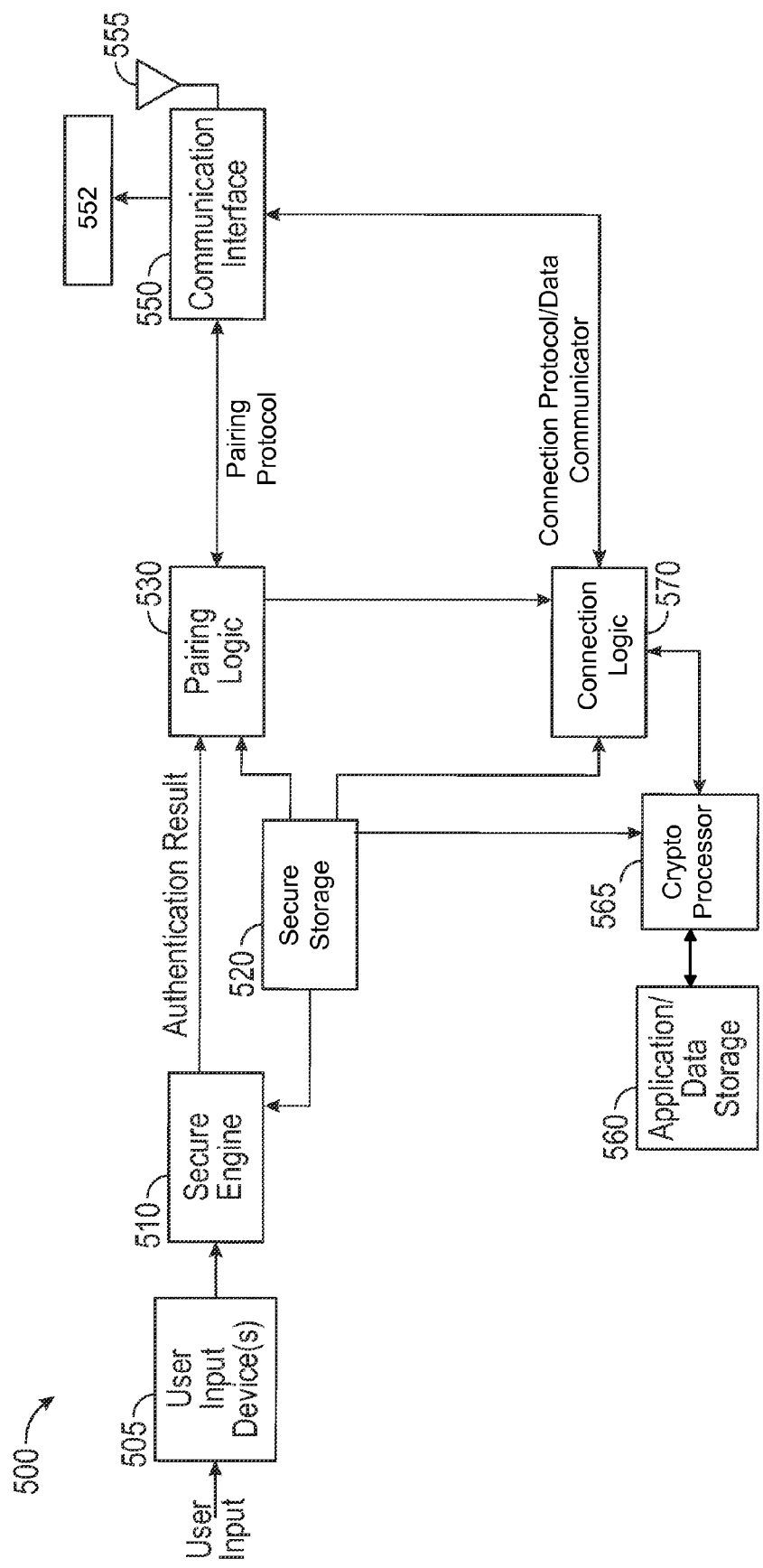
FIG. 6 is a block diagram of a portion of a system in accordance with an embodiment of the present invention.

Referring now to FIG. 6, shown is a block diagram of a portion of a system in accordance with an embodiment of the present invention. As shown in FIG. 6, system portion 500 may be a detachable portion of the system that includes substantial compute capabilities of the overall system. As discussed above, such detachable portion may include, at least, some type of processor or other compute capability, secure storage and a communication mechanism.

Portion 500 may execute in a TEE using combinations of the hardware shown in FIG. 6, along with corresponding firmware and/or software. As seen, one or more user input devices 505 are provided to receive user input. Types of user input devices vary in different examples and can include familiar keyboard, virtual keyboard, mouse, touchpad, touchscreen, and so forth, in addition to authentication-based devices such as a fingerprint scanner, eye scanner, among others. In turn, user input information from such user input devices are provided to a security engine 510 which in different implementations may be a standalone security processor (such as a hardware TPM) or security logic (such as a separate low complexity core) included within a general-purpose processor such as a multicore processor or other SoC.

Based on user input information and information stored in a secure storage 520 (such as a corresponding identity record for a user to which the user input information is compared for a relative or probabilistic match), security engine 510 may generate an authentication result, e.g., to indicate whether a given user is authenticated according to a given authentication process, as dictated by an authentication policy, which also may be stored in secure storage 520. In an embodiment, the authentication policy may provide for a multi-factor authentication, such as by way of a given combination of biometric input, password or other user-based input.

Still with reference to FIG. 6, a pairing logic 530 receives a result of this authentication, and may perform a wireless pairing protocol as described herein, e.g., with another portion of a detachable portable computing system, which may be discovered via wireless communications through a communication interface 550, which in an embodiment may provide for both wired and wireless communication (e.g. via a physical connector 552 and an antenna 555, respectively). Note that also described herein, such a wireless pairing (without a physical connection) may be performed according to a given pairing policy (also stored in secure storage 520), which may allow for such wireless re-pairing, e.g., when a master key lifetime is within a proximity of the expiration. However, for an initial pairing of the 2 devices, note that a given policy may require physical connection between the devices to perform the wireless pairing protocol (over such wired connection).

Assuming that the devices are paired, pairing logic 530 interfaces with a connection logic 570 which, based on a given connection protocol (e.g., a wireless connection protocol) creates a secure connection between the devices, such as described above to generate a set of transport keys to be used for encryption of communication between the devices.

With further reference to FIG. 6, a cryptoprocessor 565 may be present to perform data encryption and decryption using such transport keys. More specifically, when data is to be communicated between portion 500 and another device, cryptoprocessor 565 may encrypt such data (e.g., as stored in an application/data storage 560) prior to communication via communication interface 550 and/or decrypt received data. Understand while shown at this high level and with a limited number of components in the embodiment of FIG. 6, the scope of the present invention is not limited in this regard.

Figure 7:
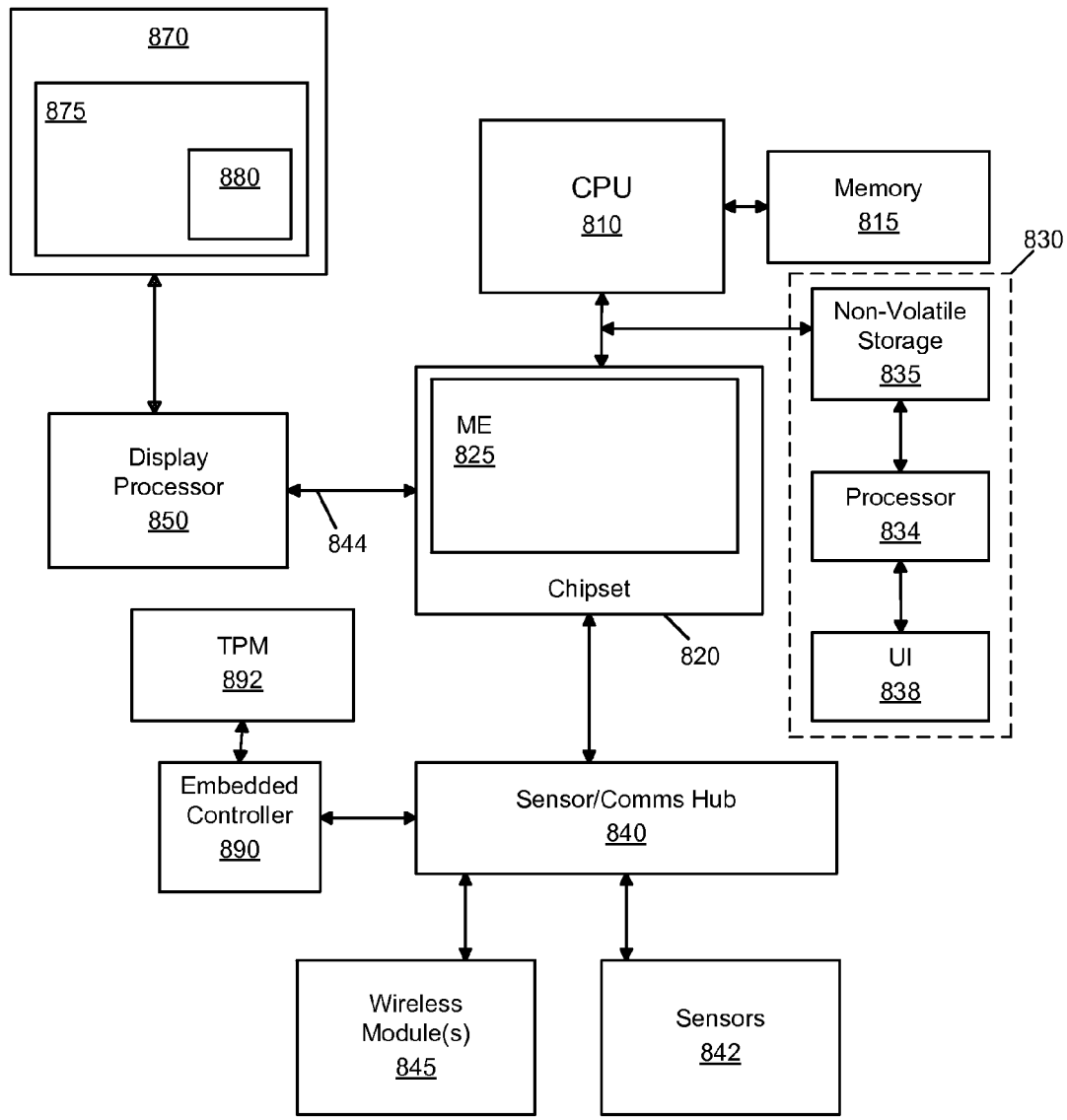
FIG. 7 is a block diagram of a system arrangement in accordance with an embodiment of the present invention.

Referring now to FIG. 7, shown is a block diagram of a system arrangement in accordance with an embodiment of the present invention. As seen in FIG. 7, system 800 may be a user platform such as a personal computer, tablet, phablet (or other form factor) that provides for convertibility or detachability. As seen, a base portion 830 includes various components that can be detachably coupled with the remainder of system 800. Further, note that both portions may be considered to be smart devices, given the presence of compute capability and storage on both sides.

First with regard to a secondary or base portion 830, shown is a processor 834, which in an embodiment may be a low power processor to perform limited amounts of computing, including the secure pairing and connection protocols as described herein. As seen, processor 834 couples to a user interface 838, which in an embodiment may include one or more user devices such as a keyboard and/or touchpad or other input device. Still further, processor 834 couples to a non-volatile storage 835, which may be a main mass storage of the system and may correspond, e.g., to a hard disk drive. In such embodiments, the hard drive may include a secure portion to store secrets in an encrypted manner. In an embodiment, the secure portion may store secrets such as a shared master key and transport keys, user identity records, device attestation information, and/or policy information as described herein.

With further reference to FIG. 7, a main or display portion includes a display 870 and various other components. Specifically, note the presence of a CPU 810, which may be a SoC or other multicore processor that is a main processor of the system and can include secure execution technologies to set up a trusted execution environment to be used as described herein. In different embodiments, the TEE may be implemented using Intel® SGX technology, Intel® TXT technology, or an ARM TrustZone. To this end, implementations may include various hardware, both general-purpose and specialized security hardware, to create a TEE and perform secure pairing and connection operations in such environments.

As seen in the embodiment of FIG. 7, CPU 810 may be coupled to a chipset 820. Although shown as separate components in the embodiment of FIG. 7, understand that in some implementations chipset 820 may be implemented within the same package as CPU 810, particularly when the CPU is implemented as an SoC. Chipset 820 may include a manageability engine 825 which in an embodiment may be used to perform at least portions of the secure pairing and connection protocols described herein. As further seen, various portions of a memory system couple to CPU 810, including a system memory 815 (e.g., formed of dynamic random access memory (DRAM)).

In the embodiment of FIG. 7, additional components may be present including a sensor/communications hub 840 which may be a standalone hub or configured within chipset 820. As seen, one or more sensors 842 may be in communication with hub 840. For purposes of user authentication and device/context attestation, such sensors can include biometric input sensors, one or more capture devices, and a global positioning system (GPS) module or other dedicated location sensor. Other sensors such as inertial and environmental sensors also may be present. As several examples, an accelerometer and a force detector may be provided and information obtained from these sensors can be used in biometric authentications. Also, in various embodiments one or more wireless communication modules 845 may be present to enable communication with local or wide area wireless networks such as a given cellular system in accordance with a 3G or 4G/LTE communication protocol.

As further seen in FIG. 7, platform 800 may further include a display processor 850 that can be coupled to chipset 820 via channel 844, which may be a trusted channel, in some embodiments. As seen, display processor 850 may couple to a display 870 that can be a touch screen display to receive user input such as responses to authentication requests. Thus in this example, configured within the display may be a touch screen 875 and a touch screen controller 880 (which of course is hidden behind the display itself). Also, in the embodiment of FIG. 7, a hardware TPM 892 couples to embedded controller 890, and may be used to perform at least portions of a pairing and/or connection protocol using secrets as described herein. Further, understand that TPM 892 may further include a secure storage to store secrets such as a shared master key and transport keys, user identity records, device attestation information, and/or policy information, as examples.

Figure 8:
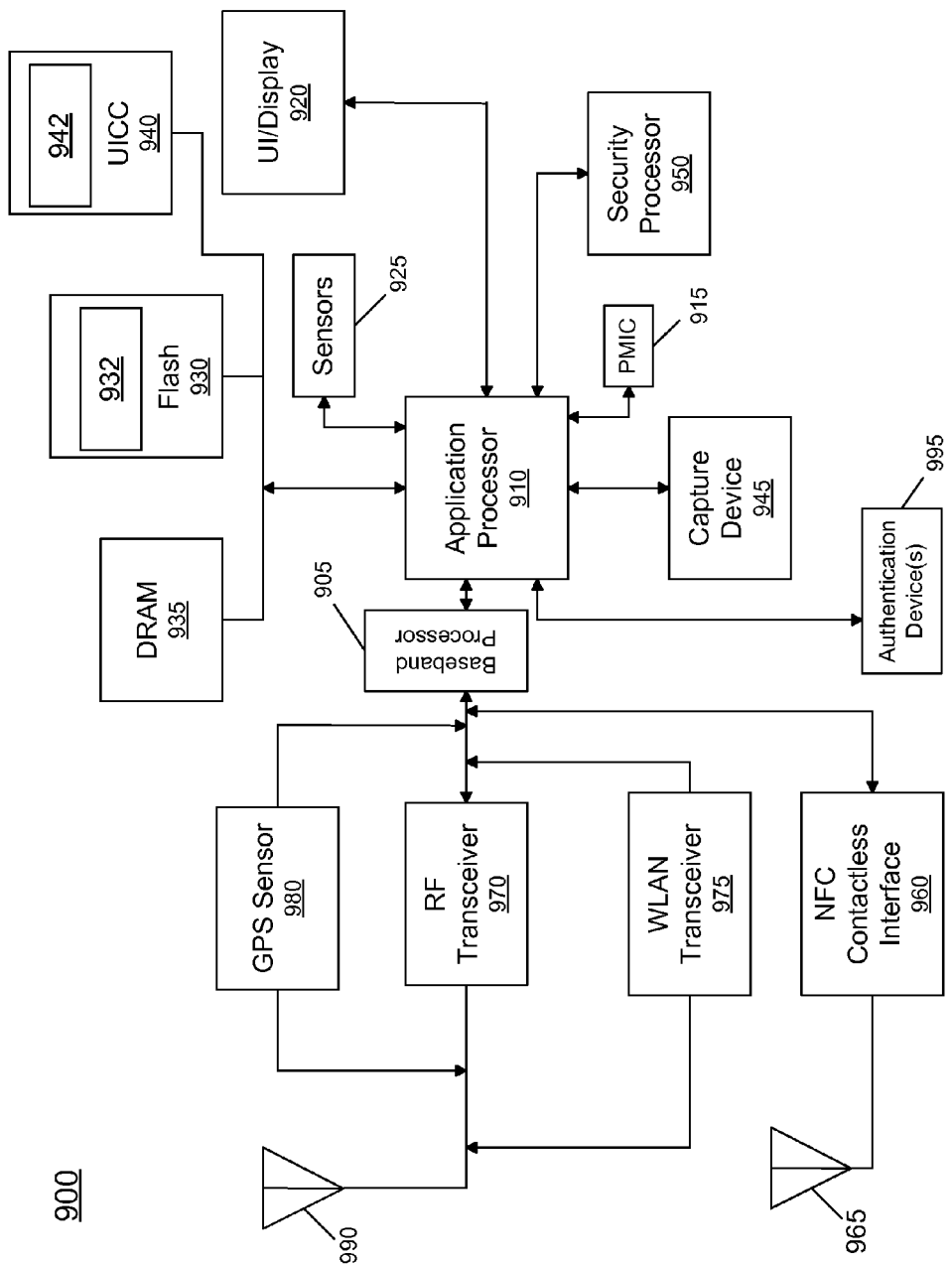
FIG. 8 is a block diagram of another example system with which embodiments can be used.

Note that embodiments are not limited to a detachable system, and may be equally applicable to secure pairing and connection of different devices to each other, as described herein. Referring now to FIG. 8, shown is a block diagram of another example system with which embodiments can be used. As seen, system 900 may be a smartphone or other wireless communicator. A baseband processor 905 is configured to perform various signal processing with regard to communication signals to be transmitted from or received by the system. In turn, baseband processor 905 is coupled to an application processor 910, which may be a main CPU of the system to execute an OS and other system software, in addition to user applications such as many well-known social media and multimedia apps. Application processor 910 may further be configured to perform a variety of other computing operations for the device.

In turn, application processor 910 can couple to a user interface/display 920, e.g., a touch screen display. In addition, application processor 910 may couple to a memory system including a non-volatile memory, namely a flash memory 930 and a system memory, namely a DRAM 935. In some embodiments, flash memory 930 may include a secure portion 932 in which shared secrets, such as a shared master key and transport keys, user identity records, attestation information, and security policies (including pairing and connection policies as described herein) may be stored. As further seen, application processor 910 also couples to a capture device 945 such as one or more image capture devices that can record video and/or still images.

Still referring to FIG. 8, a universal integrated circuit card (UICC) 940 comprises a subscriber identity module, which in some embodiments includes a secure storage 942 to store secure user information. System 900 may further include a security processor 950 that may couple to application processor 910. In various embodiments, at least portions of the secure pairing and connection techniques may be performed using security processor 950, which may be used in part to set up a TEE. A plurality of sensors 925 may couple to application processor 910 to enable input of a variety of sensed information such as accelerometer and other environmental information. In addition, one or more authentication devices 995 may be used to receive, e.g., user biometric input for use in authentication operations.

As further illustrated, a near field communication (NFC) contactless interface 960 is provided that communicates in a NFC near field via an NFC antenna 965. While separate antennae are shown in FIG. 8, understand that in some implementations one antenna or a different set of antennae may be provided to enable various wireless functionality.

A power management integrated circuit (PMIC) 915 couples to application processor 910 to perform platform level power management. To this end, PMIC 915 may issue power management requests to application processor 910 to enter certain low power states as desired. Furthermore, based on platform constraints, PMIC 915 may also control the power level of other components of system 900.

To enable communications to be transmitted and received, various circuitry may be coupled between baseband processor 905 and an antenna 990. Specifically, a radio frequency (RF) transceiver 970 and a wireless local area network (WLAN) transceiver 975 may be present. In general, RF transceiver 970 may be used to receive and transmit wireless data and calls according to a given wireless communication protocol such as 3G or 4G wireless communication protocol such as in accordance with a code division multiple access (CDMA), global system for mobile communication (GSM), long term evolution (LTE) or other protocol. In addition a GPS sensor 980 may be present, with location information being provided to security processor 950 for use as described herein. Other wireless communications such as receipt or transmission of radio signals, e.g., AM/FM and other signals may also be provided. In addition, via WLAN transceiver 975, local wireless communications, such as according to a Bluetooth™ or IEEE 802.11 standard can also be realized.

Figure 9:
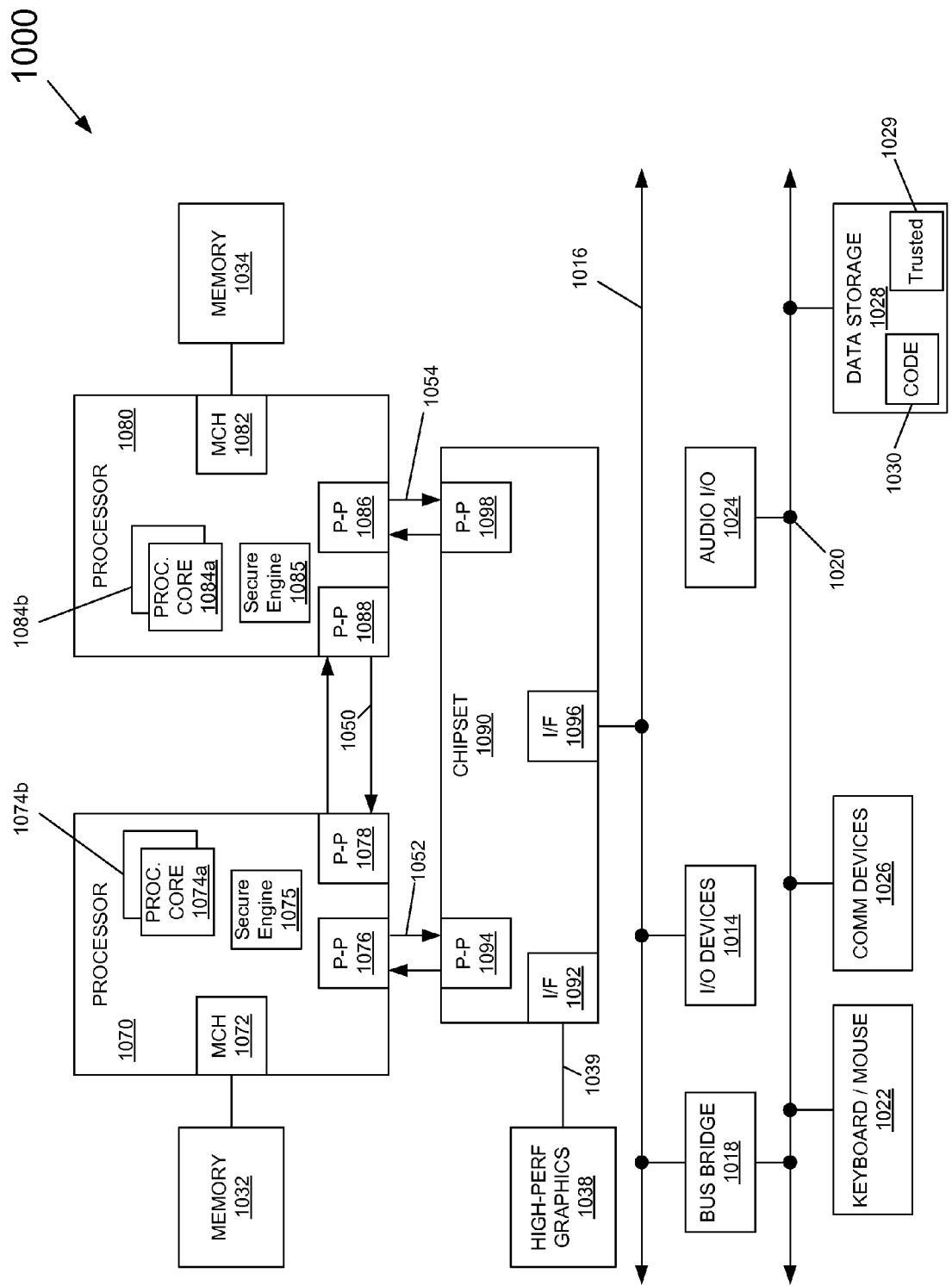
FIG. 9 is a block diagram of a system in accordance with another embodiment of the present invention.

Referring now to FIG. 9, shown is a block diagram of a system in accordance with another embodiment of the present invention. As shown in FIG. 9, multiprocessor system 1000 is a point-to-point interconnect system, and includes a first processor 1070 and a second processor 1080 coupled via a point-to-point interconnect 1050. As shown in FIG. 11, each of processors 1070 and 1080 may be multicore processors such as SoCs, including first and second processor cores (i.e., processor cores 1074a and 1074b and processor cores 1084a and 1084b), although potentially many more cores may be present in the processors. In addition, processors 1070 and 1080 each may include a secure engine 1075 and 1085 to create a TEE and to perform at least portions of the secure pairing and connection operations described herein.

Still referring to FIG. 9, first processor 1070 further includes a memory controller hub (MCH) 1072 and point-to-point (P-P) interfaces 1076 and 1078. Similarly, second processor 1080 includes a MCH 1082 and P-P interfaces 1086 and 1088. As shown in FIG. 11, MCH's 1072 and 1082 couple the processors to respective memories, namely a memory 1032 and a memory 1034, which may be portions of main memory (e.g., a DRAM) locally attached to the respective processors. First processor 1070 and second processor 1080 may be coupled to a chipset 1090 via P-P interconnects 1052 and 1054, respectively. As shown in FIG. 9, chipset 1090 includes P-P interfaces 1094 and 1098.

Furthermore, chipset 1090 includes an interface 1092 to couple chipset 1090 with a high performance graphics engine 1038, by a P-P interconnect 1039. In turn, chipset 1090 may be coupled to a first bus 1016 via an interface 1096. As shown in FIG. 9, various input/output (I/O) devices 1014 may be coupled to first bus 1016, along with a bus bridge 1018 which couples first bus 1016 to a second bus 1020. Various devices may be coupled to second bus 1020 including, for example, a keyboard/mouse 1022, communication devices 1026 and a data storage unit 1028 such as a non-volatile storage or other mass storage device which may include code 1030, in one embodiment. As further seen, data storage unit 1028 also includes a trusted storage 1029 to store user and device attestation information and policy information, as described herein. Further, an audio I/O 1024 may be coupled to second bus 1020.

The following examples pertain to further embodiments.

In Example 1, an apparatus comprises: a secure storage to store an entry having an identifier of a device to be paired with the apparatus and a master key shared between the apparatus and the device; and a connection logic to enable the apparatus to be securely connected to the device according to a connection protocol in which the device is authenticated based on the identifier of the device and the master key, the connection logic to generate a set of transport keys based on the master key and attribute information received from the device, where after the secure connection a communication between the apparatus and the device is to be protected using the set of transport keys.

In Example 2, after the secure connection between the device and the apparatus, the connection logic is to enable the device to obtain information stored in a second storage of the apparatus.

In Example 3, the apparatus of Example 1 optionally comprises a base portion of a detachable portable computing device and the device comprises a detachable portion of the detachable portable computing device.

In Example 4, the detachable portion of Example 3 optionally includes a display, a processor, and a storage, where the storage includes a secure portion to store an identifier of the apparatus and the master key.

In Example 5, the apparatus of Example 3 and the device are pre-paired during manufacture of the detachable portable computing device.

In Example 6, the entry of the secure storage of Example 3 having the device identifier and the master key comprises a default entry stored during the manufacture of the detachable portable computing device, the default entry to remain in the secure storage when the detachable portable computing device is to be restored to a factory default condition.

In Example 7, the apparatus of Example 1 optionally further comprises a wireless interface to communicate wirelessly with the device to perform the connection protocol.

In Example 8, the connection logic of Example 1 is optionally to communicate attribute information of the apparatus to the device according to the connection protocol, the attribute information of the apparatus to enable the device to generate the set of transport keys.

In Example 9, the apparatus of any of the above Examples further comprises a security logic to authenticate a user of the apparatus according to a multi-factor authentication.

In Example 10, the connection logic of Example 9 is to enable the secure connection responsive to a request of the user after the user authentication.

In Example 11, the apparatus of Example 9 further comprises a pairing logic, responsive to a request of the user, to pair the apparatus with a second device according to a pairing protocol in which a second master key is generated and stored in a second entry of the secure storage with a second identifier of the second device.

In Example 12, at least one computer readable medium includes instructions that when executed enable a system to: connect a first portion and a second portion of a computing device, while the first portion and the second portion are to be physically connected, according to a wireless communication protocol using a shared key, including generation of a set of transport keys in the first portion and generation of the set of transport keys in the second portion; and after the connection of the first portion and the second portion, encrypt data communications between the first portion and the second portion using the set of transport keys.

In Example 13, the connection of the first portion and the second portion includes: authentication of the first portion in the second portion, using an identifier for the first portion and the shared key, the identifier received from the first portion.

In Example 14, the at least one computer readable medium of Example 13 further comprises instructions that when executed, responsive to authentication of the first portion, cause the second portion to transmit an identifier for the second portion and attribute information for the second portion to the first portion.

In Example 15, the at least one computer readable medium of Example 14 further comprises instructions that when executed enable: receipt, in the second portion, of an acknowledgment message regarding authentication of the second portion in the first portion and including attribute information for the first portion; and generation of the set of transport keys using the shared key and the attribute information for the first portion.

In Example 16, the authentication of the first portion of Example 14 comprises access to an entry in a secure storage of the second portion including the identifier for the first portion and the shared key, using the identifier for the first portion.

In Example 17, a system comprises: a base portion including one or more user interface devices, a first processor, and a first secure storage including a first entry to store a master key and an identifier for a display portion to couple with the base portion; and the display portion including a display, a second processor, and a second secure storage including a first entry to store the master key and an identifier for the base portion, where the base portion and the display portion are configured to securely connect according to a wireless connection protocol via a physical connector that couples the base portion and the display portion.

In Example 18, after the secure connection, the display portion and the base portion are to communicate in an encrypted manner.

In Example 19, the system of Example 17 comprises a detachable portable computing system.

In Example 20, the first entry of the first secure storage and the first entry of the second secure storage of Example 19 comprise a default entry stored during the manufacture of the detachable portable computing system, the default entry to remain in the first secure storage and the second secure storage when the detachable portable computing system is to be restored to a factory default condition.

In Example 21, the base portion of Example 17 optionally comprises a wireless interface to wirelessly interface with a first access point and to discover the display portion when the display portion is wirelessly coupled to a second access point located remotely to the first access point.

In Example 22, the processors of the system of Example 21 optionally comprise a connection logic to perform secure connection according to a connection protocol in which a set of transport keys is generated based on the master key and corresponding identifiers and attribute information, where after the secure connection is established a communication between the base portion and the display portion is to be protected using the set of transport keys, the secure connection via an Internet protocol connection between the base portion and the display portion.

In Example 23, the system of Example 17 optionally comprises a convertible portable computing device, and where in a first mode communication between the base portion and the display portion is to be encrypted according to transport keys generated during the wireless connection protocol, and in a second mode communication between the base portion and the display portion is to be unencrypted.

In Example 24, a method comprises: determining whether one or more user attributes stored in a first identity record of the first computing device at least substantially match one or more user attributes received from a second computing device, and if so pairing the first computing device and the second computing device according to a private ring protocol, based on a pairing policy; and otherwise, determining whether at least one of device attribute information and context attribute information of the first computing device at least substantially matches at least one of device attribute information and context attribute information of the second computing device, and if so pairing the first computing device and the second computing device according to a group ring protocol, based on the pairing policy.

In Example 25, the method of Example 24 further comprises pairing the first computing device and a third computing device according to a public ring protocol via an anonymous attestation process.

In Example 26, the method of Example 25 optionally further comprises communicating untrusted information between the first computing device and the third computing device according to a public sharing policy, when the first computing device and the third computing device are paired according to the public ring protocol.

In Example 27, the method of Example 24 optionally further comprises communicating application and data information between the first computing device and the second computing device according to a private sharing policy, when the first computing device and the second computing device are paired according to the private ring protocol.

In Example 28, the method of Example 27 optionally further comprises establishing a shared key with the second computing device and performing the communication of the application and the data information in an encrypted manner using the shared key.

In Example 29, at least one machine readable medium comprises a plurality of instructions that in response to being executed on a computing device, cause the computing device to carry out a method according to any one of Examples 24 to 28.

In Example 30, an apparatus for processing instructions is configured to perform the method of any one of Examples 24 to 28.

In Example 31, an apparatus comprises means for performing the method of any one of Examples 24 to 28.

In Example 32, a system comprises: means for determining whether one or more user attributes stored in a first identity record of the first computing device at least substantially match one or more user attributes received from a second computing device, and if so for pairing the first computing device and the second computing device according to a private ring protocol, based on a pairing policy; and means for determining whether at least one of device attribute information and context attribute information of the first computing device at least substantially matches at least one of device attribute information and context attribute information of the second computing device, and if so for pairing the first computing device and the second computing device according to a group ring protocol, based on the pairing policy.

In Example 33, the system of Example 32 further comprises means for pairing the first computing device and a third computing device according to a public ring protocol via an anonymous attestation process.

In Example 34, the system of Example 33 further comprises means for communicating untrusted information between the first computing device and the third computing device according to a public sharing policy, when the first computing device and the third computing device are paired according to the public ring protocol.

In Example 34, the system of Example 32 further comprises means for communicating application and data information between the first computing device and the second computing device according to a private sharing policy, when the first computing device and the second computing device are paired according to the private ring protocol.

Understand also that various combinations of the above Examples are possible.

Embodiments may be used in many different types of systems. For example, in one embodiment a communication device can be arranged to perform the various methods and techniques described herein. Of course, the scope of the present invention is not limited to a communication device, and instead other embodiments can be directed to other types of apparatus for processing instructions, or one or more machine readable media including instructions that in response to being executed on a computing device, cause the device to carry out one or more of the methods and techniques described herein Embodiments may be implemented in code and may be stored on a non-transitory storage medium having stored thereon instructions which can be used to program a system to perform the instructions. The storage medium may include, but is not limited to, any type of disk including floppy disks, optical disks, solid state drives (SSDs), compact disk read-only memories (CD-ROMs), compact disk rewritables (CD-RWs), and magneto-optical disks, semiconductor devices such as read-only memories (ROMs), random access memories (RAMs) such as dynamic random access memories (DRAMs), static random access memories (SRAMs), erasable programmable read-only memories (EPROMs), flash memories, electrically erasable programmable read-only memories (EEPROMs), magnetic or optical cards, or any other type of media suitable for storing electronic instructions.

While the present invention has been described with respect to a limited number of embodiments, those skilled in the art will appreciate numerous modifications and variations therefrom. It is intended that the appended claims cover all such modifications and variations as fall within the true spirit and scope of this present invention.

What is claimed is:

1. An apparatus comprising:
   a secure storage to store an entry having an identifier of a device to be paired with the apparatus and a master key shared between the apparatus and the device; and
   a connection logic to enable the apparatus to be securely connected to the device when the device is physically connected to the apparatus via a wired connection according to a wireless connection protocol in which the device is authenticated based on the identifier received from the device and the master key, the connection logic to generate a set of transport keys based on the master key and attribute information received from the device, wherein after the secure connection a communication between the apparatus and the device is to be protected using the set of transport keys.

2. The apparatus of claim 1, wherein after the secure connection between the device and the apparatus, the connection logic is to enable the device to obtain information stored in a second storage of the apparatus.

3. The apparatus of claim 1, wherein the apparatus comprises a base portion of a detachable portable computing device and the device comprises a detachable portion of the detachable portable computing device.

4. The apparatus of claim 3, wherein the detachable portion includes a display, a processor, and a storage, wherein the storage includes a secure portion to store an identifier of the apparatus and the master key.

5. The apparatus of claim 3, wherein the apparatus and the device are pre-paired during manufacture of the detachable portable computing device.

6. The apparatus of claim 3, wherein the entry of the secure storage having the device identifier and the master key comprises a default entry stored during the manufacture of the detachable portable computing device, the default entry to remain in the secure storage when the detachable portable computing device is to be restored to a factory default condition.

7. The apparatus of claim 1, wherein the apparatus further comprises a wireless interface to communicate wirelessly with the device to perform the connection protocol.

8. The apparatus of claim 1, wherein the connection logic is to communicate attribute information of the apparatus to the device according to the connection protocol, the attribute information of the apparatus to enable the device to generate the set of transport keys.

9. The apparatus of claim 1, further comprising a security logic to authenticate a user of the apparatus according to a multi-factor authentication.

10. The apparatus of claim 9, wherein the connection logic is to enable the secure connection responsive to a request of the user after the user authentication.

11. The apparatus of claim 9, further comprising a pairing logic, responsive to a request of the user, to pair the apparatus with a second device according to a pairing protocol in which a second master key is generated and stored in a second entry of the secure storage with a second identifier of the second device.

12. At least one non-transitory computer readable medium including instructions that when executed enable a system to:
connect a first portion and a second portion of a computing device, while the first portion and the second portion are to be physically connected, according to a wireless communication protocol using a shared key, including generation of a set of transport keys in the first portion and generation of the set of transport keys in the second portion; and
after the connection of the first portion and the second portion, encrypt data communications between the first portion and the second portion using the set of transport keys.

13. The at least one non-transitory computer readable medium of claim 12, wherein the connection of the first portion and the second portion includes:
authentication of the first portion in the second portion, using an identifier for the first portion and the shared key, the identifier received from the first portion.

14. The at least one non-transitory computer readable medium of claim 13, further comprising instructions that when executed, responsive to authentication of the first portion, cause the second portion to transmit an identifier for the second portion and attribute information for the second portion to the first portion.

15. The at least one non-transitory computer readable medium of claim 14, further comprising instructions that when executed enable:
receipt, in the second portion, of an acknowledgment message regarding authentication of the second portion in the first portion and including attribute information for the first portion; and
generation of the set of transport keys using the shared key and the attribute information for the first portion.

16. The at least one non-transitory computer readable medium of claim 14, wherein the authentication of the first portion comprises:
access to an entry in a secure storage of the second portion including the identifier for the first portion and the shared key, using the identifier for the first portion.

17. A system comprising:
a base portion including one or more user interface devices, a first processor, and a first secure storage including a first entry to store a master key and an identifier for a display portion to couple with the base portion; and
the display portion including a display, a second processor, and a second secure storage including a first entry to store the master key and an identifier for the base portion, wherein the base portion and the display portion are configured to securely connect according to a wireless connection protocol via a physical connector that couples the base portion and the display portion.

18. The system of claim 17, wherein after the secure connection, the display portion and the base portion are to communicate in an encrypted manner.

19. The system of claim 17, wherein the system comprises a detachable portable computing system.

20. The system of claim 19, wherein the first entry of the first secure storage and the first entry of the second secure storage comprise a default entry stored during the manufacture of the detachable portable computing system, the default entry to remain in the first secure storage and the second secure storage when the detachable portable computing system is to be restored to a factory default condition.

21. The system of claim 17, wherein the base portion comprises a wireless interface to wirelessly interface with a first access point and to discover the display portion when the display portion is wirelessly coupled to a second access point located remotely to the first access point.

22. The system of claim 21, wherein the first and second processors comprise a connection logic to perform secure connection according to a connection protocol in which a set of transport keys is generated based on the master key and corresponding identifiers and attribute information, wherein after the secure connection is established a communication between the base portion and the display portion is to be protected using the set of transport keys, the secure connection via an Internet protocol connection between the base portion and the display portion.

23. The system of claim 17, wherein the system comprises a convertible portable computing device, and wherein in a first mode communication between the base portion and the display portion is to be encrypted according to transport keys generated during the wireless connection protocol, and in a second mode communication between the base portion and the display portion is to be unencrypted.

* * * * *